US012715771B2

(12) United States Patent
Pinedo González et al.

(10) Patent No.: US 12,715,771 B2
(45) Date of Patent: Aug. 25, 2026

(54) PROCESS FOR PRODUCING TECHNICAL GRADE PHOSPHORIC ACID FROM SEWAGE SLUDGE ASH

(71) Applicant: TÉCNICAS REUNIDAS, S.A., Madrid (ES)

(72) Inventors: Maria Teresa Pinedo González, Madrid (ES); Carlos Álvarez Carreño, Madrid (ES); Ana Belén Mejías Cordero, Madrid (ES); María Frades Tapia, Madrid (ES)

(73) Assignee: TÉCNICAS REUNIDAS, S.A., Madrid (ES)

( * ) Notice: Subject to any disclaimer, the term of this patent is extended or adjusted under 35 U.S.C. 154(b) by 573 days.

(21) Appl. No.: 18/255,693

(22) PCT Filed: Dec. 20, 2021

(86) PCT No.: PCT/EP2021/086694

§ 371 (c)(1),
(2) Date: Jun. 2, 2023

(87) PCT Pub. No.: WO2022/136212

PCT Pub. Date: Jun. 30, 2022

(65) Prior Publication Data

US 2025/0074772 A1 Mar. 6, 2025

(30) Foreign Application Priority Data

Dec. 21, 2020 (EP) .................................... 20383133

(51) Int. Cl.
*C01B 25/232* (2006.01)
*C01B 25/238* (2006.01)

(52) U.S. Cl.
CPC .......... *C01B 25/232* (2013.01); *C01B 25/238* (2013.01)

(58) Field of Classification Search
CPC ...... C01B 25/18; C01B 25/232; C01B 25/238
See application file for complete search history.

(56) References Cited

U.S. PATENT DOCUMENTS 4,321,245 A 3/1982 Gradl et al.
4,394,361 A 7/1983 Berkowitz et al.
(Continued)

FOREIGN PATENT DOCUMENTS

CN 109650362 A 4/2019
DE 1162817 B 2/1964
(Continued)

OTHER PUBLICATIONS

Donatello S. et al., "Production of technical grade phosphoric acid from incinerator sewage sludge ash (ISSA) ", Waste Management, 2010, vol. 30, pp. 1634-1642.
(Continued)

*Primary Examiner* — James A Fiorito
(74) *Attorney, Agent, or Firm* — Gary J. Gershik

(57) ABSTRACT

The present invention refers to an improved process for recovering phosphoric acid from sewage sludge ash, said process comprising a leaching step; a transforming step for converting phosphate metallic salts into phosphoric acid; a solvent extraction of the phosphoric acid from the leached solution with an organic solvent; a washing step for removing sulfuric acid; and stripping of phosphoric acid to obtain an aqueous solution containing phosphoric acid.

15 Claims, 2 Drawing Sheets

(56) References Cited

U.S. PATENT DOCUMENTS

| | | | |
|---|---|---|---|
| 2014/0056796 | A1 | 2/2014 | Evers et al. |
| 2016/0312333 | A1 | 10/2016 | Takhim |
| 2017/0050848 | A1 | 2/2017 | Lehmkuhl et al. |

FOREIGN PATENT DOCUMENTS

| | | | |
|---|---|---|---|
| EP | 2 602 013 | B1 | 8/2014 |
| EP | 2 792 949 | A2 | 10/2014 |
| EP | 3 438 044 | A1 | 2/2019 |
| EP | 0 004 778 | A2 | 10/2019 |
| JP | H07251141 | A | 10/1995 |
| JP | 2000044213 | | 2/2000 |
| JP | 2000095539 | | 4/2000 |
| WO | WO 80/02418 | | 11/1980 |
| WO | WO 2015/189333 | A1 | 12/2015 |

OTHER PUBLICATIONS

Gorazda, K., "Wastes. Alternative raw materials for the phosphorus industry", Przem. Chem., 2013, vol. 92, pp. 761-766 (including English translation).

Heinz, H., "Liquid-Liquid Techniques in Phosphorus Chemistry", Pure & Appl. Chem., 1980, vol. 52, pp. 809-924.

Moussa, A., "Extraction of phosphoric acid from various aquous solutions using tributyl phosphate (TBP) ", Periodica Polytechnica Chemical Engineering, 2007, vol. 51, pp. 39-42.

Petzet, S. et al., "On wet chemical phosphorus recovery from sewage sludge ash by acidic or alkaline leaching and an optimized combination of both", Water Research, 2012, vol. 46, pp. 3769-3780.

Schrodter, K. et al., "Phosphoric Acid and Phosphates", Ullmann's Encyclopedia of Industrial Chemistry, 2012, vol. 26, pp. 679 & 689.

Technical data sheet of sulphuric acid 95-98% Emprove Essential Ph Eur, BP, JPE, N, F, SAFC, Sep. 19, 2022 (with English translation).

International Search Report issued Feb. 2, 2022 in connection with PCT International Application No. PCT/EP2021/086694.

Written Opinion of the International Searching Authority issued Feb. 2, 2022 in connection with PCT International Application No. PCT/EP2021/086694.

PROCESS FOR PRODUCING TECHNICAL GRADE PHOSPHORIC ACID FROM SEWAGE SLUDGE ASH

CROSS-REFERENCE TO RELATED APPLICATIONS

This application is a § 371 national stage of PCT International Application No. PCT/EP2021/086694, filed Dec. 20, 2021, European Patent Application No. EP 20383133.4, filed Dec. 21, 2020, the entire contents of each of which are hereby incorporated by reference into the subject application.

FIELD OF THE INVENTION

The present invention concerns the recovery of reusable materials by extraction techniques, and more particularly the recovery of technical grade phosphoric acid from waste incineration, namely sewage sludge ash.

BACKGROUND

The recovery and reuse of sewage sludge has increased in recent years, largely due to environmental and political considerations.

It is a common practice at many large sewage plants to burn dewatered sludge in an incinerator. The resultant ash is a mainly inorganic residue containing various metals, such as P, Fe, Al, Ca and Si. The disposal of this ash without further treatment may cause serious environmental pollution, mainly due to the presence of heavy metal and toxic substances in combination to the metals mentioned above. Furthermore, the untreated ash has light weight and is finely divided and dusty, with the result of its difficulty to handle, transport and dump. Therefore, the disposal of such ash is an increasing problem in many parts of the world.

In view of that problem, it has become necessary to develop different procedures for the treatment of these residues with the aim of recovering the elements contained therein to be reused in different applications.

Actually, there have been many different attempts and methods of using sewage sludge as a valuable source of raw materials in the state of the art. The recovery of reusable materials from the sewage sludge is of increasing significance that concerns, in particular, the reusable of phosphorous material for which there is a world-wide high demand with, at the same time, limited availability.

Depending on the mode of operation of the sewage treatment plant, the concentration of phosphorous in sewage sludge ashes (SSAs) is between 4 and 8 wt % and between 10 and 22 wt % of $P_2O_5$. Further main components of the SSAs are CaO, $SiO_2$, $Al_2O_3$ and $Fe_2O_3$.

Various approaches have been disclosed in the prior art for obtaining phosphorous from the sewage sludge ash resulting from incineration processes. Reported work regarding phosphorous recovering from sewage sludge ash is either related to thermo-chemical treatment or acid leaching processes.

Within thermo-chemical treatment, sewage sludge ash is mixed with chloride salts and the resulting mixture is subjected to a temperature between 90° and 1100° C. Under these conditions, metal chlorides are volatilized and phosphorous converted to a more bio-available form so that it can be used, for example, as a fertilizer.

WO2015/189333 describes a method for obtaining citrate soluble phosphate compound from sewage sludge ash, said method is also based on the calcination of a mixture of the P-containing raw material with an alkaline-sulfuric compound. The resulting product easily releases phosphate ions to produce a fertilizer.

However, there are concerns over the operating costs of thermo-chemical treatment and with equipment lifetime due to the highly corrosive conditions generated.

On the other hand, acid washing processes (also referred as to acid leaching processes) have, among many others, the benefit of potentially lower energy consumption.

Document EP0004778 describes a process for the treatment of sewage sludge ash comprising the leaching of the ash in an acidic solution, more particularly in a sulfuric acid solution, at a temperature of not more than 100° C. to recover phosphoric acid, and further treatment of the undissolved residue to recover precious metals.

US2014/0056796 refers to a method for recovery phosphates by a first leaching step in the presence of an acidic solution at about 20-40° C., and further phosphate isolation by re-precipitation.

EP2792949 discloses a process for the production of phosphorous-containing compounds from sewage sludge ash including the addition of an acid, such as HCl, to leach the ash, and subsequent precipitation stages to obtain and separate a calcium phosphate.

EP2602013 also refers to a process for recovering phosphorous compounds from sewage sludge ash, which first includes an acid digestion or leaching of said raw material with a dilute mineral acid, with subsequent addition of aluminium salts to precipitate and to separate phosphorous compounds.

In these cases, the resulting phosphorous-containing products are low grade and most of them are used in agriculture as phosphate fertilizers.

Although most of global phosphate demand is for fertilizer manufacture, there are other specialty applications that require technical grade phosphoric acid (85% concentration) which even attracts significantly higher revenues than merchant grade phosphoric acid (50% concentration) generally used in said fertilizing manufacture.

In fact, an advantage derived from the acid leaching process is the possibility to produce a phosphoric acid product that could be tailored to niche products with potentially higher market prices.

US2016/0312333 refers to a process for the treatment of ash resulting from incineration of sludge, said process includes the digestion of the ash by a liqueur attack containing phosphate ions in solution, thus obtaining a first liquid phase containing phosphate ions which is separated from a solid phase containing some impurities. The first liquid phase is subjected to a purification step by means of liquid-liquid extraction with an organic solvent or by applying an ion exchange resin, so as to obtain a second liquid phase having also phosphate ions but a lower content of other metals. This second liquid phase can even be subjected to a re-extraction step by using a re-extraction aqueous agent thus obtaining an aqueous phase containing the phosphate ions which is separated from the organic phase. The liquid phase obtained after this purification step is a purified phosphoric acid solution which contains metal ions in low proportions.

Donatello et al. (Waste Management, 2010, 30, 1634-1642) describe the recovery of phosphorous from sewage sludge ash by using a sulfuric acid washing procedure to obtain technical grade phosphoric acid. The influence of reaction time, sulfuric acid concentration, liquid to solid ratio and source of sewage sludge ash on phosphorous recovery is examined. The process includes a leaching step with sulfuric acid, subsequent filtration and further purification and concentration of the liquid phase obtained therefrom. The purification step is carried out by using a cation exchange resin in order to remove or at least reduce the content of metallic cations, while the concentration of the purified filtrate is made by evaporating excess water.

JP07251141 describes the recovery of phosphorous component from the incinerated ash of sewage sludge without any pre-treatment by eluting the phosphorous component from the ash with an acidic solution, separating the eluate and insoluble residue and extracting the phosphorous component with an organic solvent to form the two phases of eluate and water.

In spite of the procedures described in the prior art to produce purified phosphoric acid, there is still a need to optimize the experimental parameters, as well as the operating steps, that allow the phosphate extraction from sewage sludge ash in a very efficient and selective way in order to obtain a technical grade phosphoric acid.

BRIEF DESCRIPTION OF THE INVENTION

The authors of the present invention have developed a new process for treating incinerated sewage sludge that allows the production of technical grade phosphoric acid, being also possible to separate other metals contained in the ash, such as Fe, by standard procedures known in the art, to be used in different applications.

This invention is based on the development of a process that allows phosphoric acid to be extracted in a very efficient way with a high level of purity. It is essentially a closed-loop process that allows almost quantitatively recovering the phosphorous contained in a sewage sludge material in the form of phosphoric acid.

In particular, by the process of the invention, at least 80% of the phosphorous present in the ash is digested and recovered. Furthermore, the process provides a phosphoric acid that meets the standards required to be considered of technical grade with a minimum level of impurities.

Thus, the main aspect of the present invention refers to a process for recovering phosphoric acid from a solid phosphorous-bearing raw material, said process comprising:

- a) a leaching step of the phosphorous-bearing solid raw material with a sulphuric acid aqueous solution having a pH between 1 and 2 and at a temperature equal to or lower than 40° C., thus obtaining:
  - i) a first leached solution comprising, solubilized, a main fraction of the phosphorous contained in the solid raw material in the form of phosphoric acid and phosphate metallic salts; and
  - ii) a non-leached solid residue comprising the remaining fraction of the phosphorous contained in the solid raw material as well as most of the iron, calcium and aluminum contained in said solid raw material;
- b) a transforming step wherein sulfuric acid is added to the first leached solution obtained in step (a) so as the phosphate metallic salts are transformed into phosphoric acid, thus obtaining a second leached solution comprising phosphoric acid as well as metallic impurities in the form of sulphates;
- c) a first solvent extraction of the phosphoric acid from the second leached solution obtained in step b) with an organic solvent, thus obtaining a first phosphoric acid-loaded organic liquid phase and a first aqueous raffinate also containing phosphoric acid as well as impurities;
- d) washing the first phosphoric acid-loaded organic liquid phase obtained in step c) with diluted phosphoric acid aqueous solution, thus obtaining a second phosphoric acid-loaded organic liquid phase and a second aqueous raffinate containing sulphuric acid and metallic impurities;
- e) a first stripping of phosphoric acid from the second phosphoric acid-loaded organic liquid phase obtained in step d) with water at a temperature between 5° and 70° C., thus obtaining a first aqueous solution containing phosphoric acid;
- f) subjecting the first aqueous raffinate obtained in step c) to a second solvent extraction which comprises:
  - adding sulfuric acid to the first aqueous raffinate to form a mixture;
  - extracting the phosphoric acid from the mixture with an organic solvent, thus obtaining:
    - a third phosphoric acid-loaded organic liquid phase also containing sulfuric acid, and
    - a second aqueous raffinate containing impurities and non-extracted sulfuric acid,
- g) a second stripping of phosphoric acid from the third phosphoric acid-loaded organic liquid phase obtained in step f) with water at a temperature between 5° and 70° C., thus obtaining a second aqueous solution containing phosphoric acid and sulfuric acid, said second aqueous solution is, at least partially, lead to the leaching step a).

DETAILED DESCRIPTION OF THE INVENTION

Figure 1:
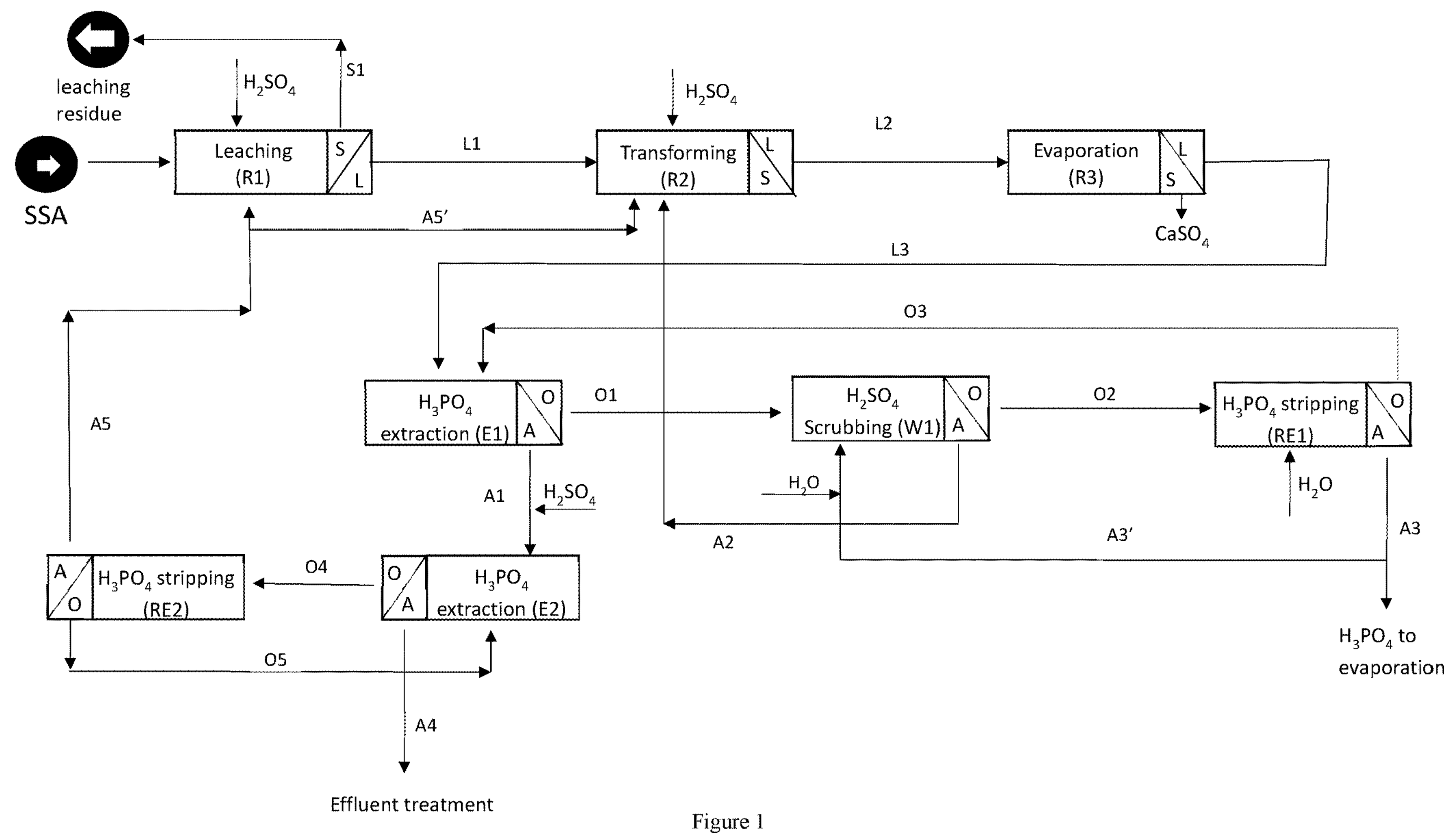
FIG. 1 illustrates a flow chart schematically representing the steps of the process of the invention.

The method of the present invention is applicable to the treatment of phosphate- or phosphorous-bearing raw material, also referred to as solid residue. In the sense of the invention, the term "phosphate- or phosphorous-containing raw material" refers to a solid residue which contains at least one phosphate, as defined herein.

In a particular embodiment, the phosphate- or phosphorous-bearing raw material is an ash originating from the incineration of organic material, for example from sewage sludge and bio-wastes. This ash consists mainly of oxides of various metals, such as, $Al_2O_3$, $Fe_2O_3$, MgO, $P_2O_5$, $P_4O_{10}$, $K_2O$, $SiO_2$, and other components like $Ca_9Al(PO_4)_7$, $Ca_2Si$, $Al_2(SiO_4)O$, etc.

More preferably, the ash originates from the incineration of sewage sludge and it is therefore referred to as sewage sludge ash.

In the context of the present invention, the term "sewage sludge" refers to any suspension of finely dispersed particles of a solid substrate in a liquid. In a preferred embodiment, the liquid in which the particles are suspended is waste water as herein defined.

The term "waste water" relates to all liquids of aqueous nature and/or organic nature, or mixtures thereof, which do not have drinking water quality within the meaning of drinking water standards.

In a particular embodiment, the sewage sludge occurs as primary sludge, raw sludge, excess sludge, as treated and/or stabilized sewage sludge (aerobic/anaerobic).

The term "bio-wastes" relates to all organic wastes of animal or plant origin that is generated in a household or factory and can de degraded by microorganisms, soil-living organisms or enzymes.

The term "phosphates" concerns $P_2O_5$ and $P_4O_{10}$. Furthermore, the term "phosphates" refers to the salts and esters of orthophosphoric acid ($H_3PO_4$) and involves expressly the condensates (polymers) of orthophosphoric acid and their esters. In particular, the term "phosphates" refers to metallic salts of phosphoric acid with the general formula $X(Y)_m(PO_4)_n$, where X, and optionally Y, is a metal selected from the group consisting of aluminium, beryllium, bismuth, lead, cadmium, chromium, iron, gallium, indium, potassium, cobalt, copper, magnesium, manganese, molybdenum, sodium, nickel, osmium, palladium, rhodium, ruthenium, strontium, titanium, vanadium, tungsten, zinc and tin.

Preferably, the ash treated by this process has a phosphorous content, expressed in percentages by weight of phosphates in the ash, of at least 5%, ideally of at least 7% and preferably from 7 to 20%.

The phosphorous-bearing raw material, before being used as feed in the process of the invention, may be finely ground until reaching an appropriate particle size with a maximum size of 2 mm.

The different steps of the process of the invention are detailed herein below.

Leaching Step (Step a)

The first step of the process of the invention consists in a leaching of the phosphorous-bearing solid raw material with an acid aqueous solution, namely a sulphuric acid aqueous solution having a pH between 1 and 2. Feeding the sulphuric acid aqueous solution to leaching is controlled so as to maintain the resulting acid aqueous solution at a pH between 1 and 1.5, more preferably at a pH of 1.

Unlike other strong acids, such as chloride acid or, specially, phosphoric acid, the use of sulphuric acid is more selective as it allows dissolving most of the phosphorous contained in the phosphorous-bearing solid raw material but reduces significantly the dissolution of metallic impurities such as iron, aluminium and calcium.

Under the conditions mentioned above, a main fraction of the phosphorous contained in the solid raw material is gradually leached mainly in the form of phosphoric acid and in a much less extend in the form of phosphate metallic salts, such as iron, aluminium, calcium and magnesium. As a result, an aqueous phase containing said main fraction of phosphorous in the form of phosphoric acid and phosphate metallic salts is obtained, whereas the remaining fraction of the phosphorous from the solid raw material remains undissolved as a non-leached solid residue along with most of the metallic impurities contained in said solid raw material.

In a particular embodiment, the phosphorous-bearing raw material is leached in the sulphuric acid aqueous solution at a temperature equal to or lower than 40° C., more preferably from 20 to 40° C., even more preferably from 30 to 40° C., and most preferable at 40° C.

As a result of these conditions, the leaching step causes phosphorous to be dissolved in preference to other metal components. In this step, from 80 to 90 wt % of the phosphorous contained in the raw material is dissolved in the leaching acid aqueous solution.

Said leaching step with the sulphuric acid aqueous solution takes place preferably with a residence time between 10 minutes and 1 hour, more preferably between 10 and 50 minutes.

The sulphuric acid aqueous solution used in the leaching step is, preferably, an aqueous medium which contains a weight majority of sulfuric acid, optionally in combination with other acids, such as phosphoric acid.

Advantageously, this sulphuric acid aqueous solution at least partly consists of a recycled solution resulting from the second stripping step of phosphoric acid according to step g) of the process of the invention, i.e., the second aqueous solution resulting from step g) which contains sulphuric acid and a lower amount of phosphoric acid as detailed below.

Thus, after the leaching step, a phosphorous-rich solution (also referred to as first leached solution) is obtained mainly comprising, solubilized, phosphoric acid, as well as phosphate metallic salts of iron, aluminium, calcium and magnesium and sulphate metallic salts resulting from the reaction of sulphuric acid with metal oxides present in the solid raw materials. In addition to that, a non-leached solid residue is also obtained still containing a minor fraction of the phosphorous contained in the solid raw material, in combination with most of the metallic impurities, mainly in the form of sulphates.

Accordingly, a solid-liquid separation treatment may be carried out in order to separate said first leached solution containing phosphoric acid along with other impurities from the non-leached solid residue.

After separation of the undissolved residue from the leached solution, the first leached solution containing the phosphoric acid is brought to the transforming step b), whereas the non-leached solid residue is removed from the system and can be used for other industries, such as cement industry.

In a particular embodiment, the first leached solution containing the phosphoric acid can be previously fed to a sulfidizing area in order to remove possible Cu traces present in said leached solution in the form of $CuSO_4$. For doing that, $Na_2S$ is added to the leached solution under controlled redox conditions, where the following reaction takes place:

$$CuSO_{4\,(l)}+Na_2S_{(l)}\rightarrow CuS_{(s)}+Na_2SO_{4\,(l)}$$

In a preferred embodiment, the dose of $Na_2S$ used in the sulfidizing step ranges from 2 to 3 g per kg of solid residue, more preferably said dose is 2.5 g $Na_2S$/kg solid residue. Under these conditions, a redox potential between 50 and 300 mV is reached, preferably from 230 to 270 mV (Ag/AgCl).

This sulfidizing step may be carried out from room temperature to up to 50° C. with a residence time from 5 minutes to 50 minutes, preferably from 7 to 20 minutes.

As a result, a solid containing Cu in the form of CuS is obtained with a precipitation efficacy of more than 85%. Said CuS is removed from the system, whereas the liquid phase containing the phosphoric acid is fed to the transforming step.

Transforming Step (Step b)

As mentioned above, the first leached solution obtained in step a) contains phosphoric acid as well as phosphorous in the form of metallic phosphates, so it is desirable to transform said metallic phosphates into phosphoric acid in order to increase the concentration of phosphorous in the form of phosphoric acid.

In this step b), sulphuric acid is added to the first leached solution obtained in the leaching step a), thus obtaining a liquor containing all the leached phosphorous from the phosphorous-bearing raw material in the form of phosphoric acid along with some metallic impurities in the form of sulphates.

In a particular embodiment, the sulphuric acid used in this step is sulphuric acid 98%.

Advantageously, the sulfuric acid added in this step corresponds to a sulfuric acid solution that at least partly consists of:

(i) a recycled aqueous solution resulting from the second stripping step of phosphoric acid according to step g) of the process of the invention, i.e., the second aqueous solution resulting from step g), and/or (ii) a recycled aqueous solution resulting from the washing step of the first organic extraction phase according to step (d) of the process of the invention, i.e., the acid aqueous solution resulting from step d).

In another particular embodiment, sulphuric acid is used in a dose which varies from 20 to 50 g per liter of leached solution, preferably from 30 to 40 g per liter of leached solution, provided that the resulting solution has a pH from 1.5 to 1.

Advantageously, step b) of the process of the invention may be carried out at a temperature equal to or lower than 40° C., preferably between 3° and 40° C.

In a particular embodiment, step b) takes place with a residence time of at least 10 minutes, preferably from 10 minutes to 1 hour, more preferably for 15 minutes.

As mentioned before, this step has allowed the conversion of the phosphorous present in the form of metallic phosphates into phosphoric acid, whereas the metal impurities are in the form of sulphates, mainly iron, aluminium and magnesium sulphates.

Thus, this step provides a high concentration of phosphoric acid in the resulting liquor solution. Particularly, it provides an increase in the concentration of phosphoric acid of up to 30% with respect to the phosphoric acid contained in the first leached solution resulting from step a).

Consequently, as a result of step b), a $H_3PO_4$-rich leached solution is obtained, also referred to as second leached solution which is fed to the solvent extraction step c).

In a particular embodiment, said $H_3PO_4$-rich leached solution can be subjected to an evaporation step in order to concentrate the phosphoric acid stream before entering extraction step c). For doing that, said $H_3PO_4$-rich leached solution is subjected to a heating process to evaporate water, thus obtaining a liquid stream with a higher concentration of phosphoric acid, as well as a solid residue mainly consisting of $CaSO_4$ which can be removed from the liquid stream.

Preferably, the evaporation step is conducted so as the evaporation ratio is up to 5/1 v/v inlet/outlet, in other words, the evaporation allows to increase the concentration of phosphoric acid up to five times, more preferably up to 4 times.

The heating process can be carried out at a temperature lower than the boiling point of phosphoric acid, preferably lower than 120° C. but higher than 100° C.

Solvent Extraction (Step c)

The $H_3PO_4$-rich leached solution obtained in step b), either as such or after being subjected to evaporation, is then subjected to a liquid-liquid extraction step (step c)) in order to separate the metal impurities present in said solution, more particularly, Al, Mg and Fe, from the phosphoric acid, thus contributing to obtain phosphoric acid with high purity.

This step includes the extraction of phosphoric acid by putting in contact the $H_3PO_4$-rich leached solution obtained in step b) with an organic solvent, preferably under countercurrent conditions. Therefore, an organic extraction phase containing phosphoric acid and an aqueous phase containing non-extracted phosphoric acid and impurities are obtained. The organic solvent traps the molecules of phosphoric acid by means of a solvatation process.

The organic solvent is preferably selected from methyl iso-butyl ketone (MIBK), tributyl phosphate (TBP), 1-heptanol, di-isopropyl ether (DIPE), and mixtures thereof, for example a mixture of MIBK and TBP, a mixture of MIBK and 1-Heptanol, a mixture of TBP and 1-Hepatanol, more preferably the organic solvent is TBP. Said organic solvent is used without being dissolved in any other organic compound.

Preferably, this extraction step is carried out at a room temperature, preferably between 2° and 30° C., more preferably at 25° C., with a residence time ranging from 5 to 10 minutes. This extraction step can be performed several times, such as twice or three, four or five times.

During this step, the phosphoric acid is selectively and gradually loaded into the organic liquid phase. Therefore, after conducting the extraction step, a phosphorous-loaded organic phase is formed also containing a very low amount of impurities, mainly sulphuric acid and some metals such as arsenic. In addition to that, an acid aqueous extraction phase is also obtained, also referred to as an aqueous raffinate, containing most of the metallic impurities previously present in the $H_3PO_4$-rich leached solution, said aqueous raffinate is then fed into the Depletion stage of the process of the invention as explained below.

Washing Step (Step d)

As mentioned above, and since sulphuric acid is used in the leaching step as well as in the transforming step, some minor amount of said acid is extracted in the organic phase along with phosphoric acid, making advisable to remove it therefrom in order to avoid the phosphoric acid to contain such impurity.

Therefore, the process of the invention further comprises a washing step involving the washing of the organic extraction phase resulting from step c) with a diluted aqueous solution of an acid, such as phosphoric acid, thus providing a washed organic phase containing phosphoric acid and an aqueous phase containing sulfuric acid and other minor, if any, co-extracted metal cation impurities, such as zinc and iron. Said aqueous phase containing the extracted sulfuric acid may be also recycled into the transforming step with the aim of reducing the intake of such acid.

In a particular embodiment, the concentration of phosphoric acid in the aqueous solution is around 120 g/L.

Said washing step may be carried out at a temperature between 20 and 60° C., preferably from 40 to 60° C., with a residence time ranging from 5 to 15 min.

Stripping Step (Step e)

The phosphorous-loaded organic phase obtained after conducting step d) is then subjected to a stripping step (step e) in the presence of water in order to recover the phosphoric acid.

This stripping step is preferably carried out at temperature lower than 70° C., preferably from 40 to 65° C., with a residence time ranging from 5 to 15 min.

As a result of this step, a purified aqueous solution of phosphoric acid is obtained with a phosphoric acid concentration ranging from 20 to 30%, and also an organic stream comprising the organic extractant which can be recycled to the extraction step c).

Subsequently, said purified aqueous solution of phosphoric acid may be subjected to concentration by means of evaporation, thus reaching a concentration of at least 75% required for a technical grade phosphoric acid.

In a particular embodiment, part of said purified aqueous solution may be recycled to be used in the washing step d).

Although the washing step d) mentioned above allows an efficient removal of the sulfuric acid co-extracted in the organic phase, a very small quantity can be still retained (ppms) in the organic solvent which is subsequently reported and concentrated in the final product.

Thus, in a preferred embodiment, and in order to remove the residual sulfuric acid, the process of the invention also includes a precipitation step which comprises the addition of $BaCO_3$ to the aqueous solution of phosphoric acid resulting from step e) or to the concentrated aqueous solution of phosphoric acid, thus precipitating $SO_4^{2-}$ ions in the form of $BaSO_4$ according to the following reaction:

$$BaCO_{3\,(s)}+H_2SO_{4\,(l)}\rightarrow BaSO_{4\,(s)}+CO_{2\,(g)}+H_2O_{(l)}$$

In a particular embodiment, this precipitation step is carried out at a temperature between 60 and 90° C., preferably from 70 to 85° C., with a residence time ranging from 5 to 15 min.

If the concentration/evaporation of the purified aqueous solution of phosphoric acid resulting from step e) has not been effected previously, the resulting aqueous solution obtained after the removal of sulfuric acid, by precipitation in the form of $BaSO_4$, may be then subjected to evaporation in order to reach a concentration of at least 75% required for a technical grade phosphoric acid.

In another particular embodiment, the process of the invention further comprises a step to remove the As cation from the purified aqueous solution of phosphoric acid obtained after the stripping step e) or from the purified aqueous solution of phosphoric acid obtained after removal of sulfuric acid and/or concentrated aqueous solution. This step includes the addition of $Na_2S$ or $H_2S$ to said aqueous solution, thus obtaining a liquor of phosphoric acid without As cation impurities and a solid containing precipitated As in the form of $As_2S_3$ according to the following reaction:

$$2H_3AsO_{3\,(l)}+3\ Na_2S_{(l)}\rightarrow As_2S_{3\,(s)}+6NaOH_{(l)}$$

Said solid containing precipitated As can be removed by filtration. By means of this process, the precipitation efficacy of As is close to 99%.

In a particular embodiment, this precipitation step of As is carried out at a temperature between 2° and 40° C., preferably from 25 to 35° C., with a residence time ranging from 5 to 15 min.

On the other hand, and in order to recover the phosphorous contained in the first aqueous raffinate resulting from the solvent extraction step (c) and, therefore, to increase the overall phosphorous recovery efficiency, the process of the invention further includes a depletion stage which comprises two main steps: a second solvent extraction step and a second stripping step which will be detailed herein below.

Second Solvent Extraction (Step f)

In this step, concentrated sulfuric acid is firstly added to the first aqueous raffinate resulting from step c), thus leading to a mixture comprising the non-extracted phosphoric acid and sulfuric acid. In a particular embodiment, the sulfuric acid is added so as a concentration of up to 400 g/L of sulfuric acid is reached in said mixture.

The resulting mixture containing the phosphoric acid and the sulfuric acid is then subjected to a second solvent extraction step so as it allows to further separate the phosphoric acid from metal impurities contained in the first aqueous raffinate.

As in the first solvent extraction step, this step also includes the extraction of phosphoric acid, along with sulfuric acid, by putting in contact the mixture obtained above with an organic solvent, preferably under counter-current conditions. The organic solvent traps the molecules of phosphoric acid and sulfuric acid by means of a solvation process.

Accordingly, a third phosphoric acid-loaded organic liquid phase, also containing sulfuric acid, is obtained, along with a second aqueous raffinate containing metal impurities and non-extracted sulfuric acid.

The organic solvent used in this second solvent extraction step is also preferably selected from methyl iso-butyl ketone (MIBK), tributyl phosphate (TBP), 1-heptanol, di-isopropyl ether (DIPE), and mixtures thereof, for example a mixture of MIBK and TBP, a mixture of MIBK and 1-Heptanol, a mixture of TBP and 1-Hepatanol, more preferably the organic solvent is TBP. Said organic solvent is used without being dissolved in any other organic compound.

Preferably, this second extraction step is carried out at a room temperature, preferably between 20 and 30° C., more preferably at 25° C., with a residence time ranging from 5 to 15 minutes. This extraction step can be performed several times, such as twice or three times.

During this step, the phosphoric acid, as well as the sulfuric acid, are selectively and gradually loaded into the organic liquid phase. Therefore, after conducting the second extraction step, a third phosphorous-loaded organic phase is formed also containing sulphuric acid. In addition to that, an acid aqueous extraction phase is also obtained, also referred to as second aqueous raffinate, containing most of the metallic impurities coming from the $H_3PO_4$-rich leached solution. Said second aqueous raffinate may be brought to an effluent treatment.

Said effluent treatment stage is made with the aim of removing the impurities present in said second aqueous raffinate and in order to meet pourability requirements. This effluent treatment may be made by precipitation of impurities in the form of carbonates or hydroxides.

In a particular embodiment, the second aqueous raffinate is reacted with a precipitating agent such as calcium carbonate or calcium hydroxide, so as solid carbonates and hydroxides of the metal impurities present in the aqueous raffinate are formed.

Preferably, this effluent treatment is carried out at a room temperature, preferably between 2° and 30° C., at a pH between 6 and 9.

Second Stripping Step (Step g)

The third phosphorous-loaded organic phase obtained after conducting step f) is then subjected to a second stripping step (step g)) in the presence of water in order to recover the phosphoric acid and sulfuric acid in pure form.

This stripping step is preferably carried out at temperature lower than 70° C., preferably from 40 to 65° C., with a residence time ranging from 5 to 15 min.

This extraction step can be performed several times, such as twice or three times.

As a result of this step, a purified aqueous solution of phosphoric acid and sulfuric acid is obtained, and also an organic stream comprising the organic extractant which can be recycled to the second extraction step f).

The resulting purified aqueous solution of phosphoric acid and sulfuric acid is fed to the leaching step a), or alternatively the resulting purified aqueous solution of phosphoric acid and sulfuric acid is split into two separate streams, one stream is fed to the leaching step a) and the other one is fed to the transforming step b), thus providing an essentially closed-loop process that allows almost quantitatively recovering the phosphorous contained in the solid raw material in the form of phosphoric acid.

FIG. 1 illustrates a flow chart of an installation for producing phosphoric acid applying a process according to example 1 below.

Example 1. Production of Technical Grade Phosphoric Acid

A solid sewage ash (SSA) was fed to a leaching area (R1). There, the SSA was leached with a sulfuric aqueous solution 98% using a dose of 300 g per kg of SSA so as the pH at the end of the reaction is 1. The leaching was carried out at a temperature of 40° C. and the residence time was 20 minutes. Said sulfuric acid solution partly consisted of the aqueous solution (A5) originating from the stripping area (RE2) as detailed below.

Under these conditions, a phosphorous-rich leached solution (L1) comprising solubilized phosphoric acid, as well as minor amounts of Fe, Al, Ca in the form of phosphates and sulfates and other impurities, was obtained along with a non-leached solid residue (S1) containing the remaining phosphorous that had not been leached.

Table 1 shows the composition of the leached solution (L1) and the non-leached solid residue (S1) after the leaching step:

| | Leached solution (L1), g/L | Non-leached solid residue (S1), % |
|---|---|---|
| P | 33-36 | 0.6-1.5 |
| $H_3PO_4$ | 70-80 | |
| $H_2SO_4$ | <5 | |
| $SO_4^{2-}$ | 19-25 | 25-29 |
| Fe | 3.0-4.0 | 15-16 |
| Cu | 0.12-.015 | 0.025-0.030 |
| Al | 3.5-4.5 | 2-2.5 |
| Ca | 0.7-0.8 | 10-12 |
| Zn | 0.15-0.25 | 0.05-0.08 |
| Ti | 0.04-0.06 | 0.3-0.5 |
| Mg | 3.5-3.8 | 0.1-0.3 |
| K | 0.7-1.2 | 0.1-0.3 |
| Mn | 0.21-0.24 | 0.02-0.03 |
| As | 0.0025-0.0031 | 0.00004-0.0006 |

As can be seen, most of the phosphorous contained in the solid sewage ash is transferred to the leached solution in the form of phosphoric acid and phosphates, whereas most of Fe, Ca and a high amount of Al are retained in the solid residue, thus reducing significantly the amount of impurities in said leached solution.

Subsequently, a solid-liquid separation treatment was performed in order to separate the leached solution (L1) from the non-leached solid residue (S1).

The resulting leached solution (L1) was fed to the transforming area (R2) in order to transform the phosphorous present in the form of metal phosphates salts into phosphoric acid. 35 g of sulfuric acid 98% per liter of leached solution (L1) was added to said leached solution (L1) at a temperature between 3° and 40° C. for 15 minutes. An aqueous liquor (L2) was obtained containing all the leached phosphorus from the SSA in the form of phosphoric acid along with some metal impurities in the form of sulfates.

The composition regarding phosphoric acid, phosphates, sulfuric acid and sulfates of the leached solution (L2) at the exit of the transforming area mainly contained the components as shown in Table 2 below:

| | (L2), g/L |
|---|---|
| P | 32-36 |
| $H_3PO_4$ | 90-110 |
| $H_2SO_4$ | 0-10 |
| $SO_4^{2-}$ | 50-55 |

As it is shown, this step allowed providing the leached phosphorous from the SSA essentially in the form of phosphoric acid.

The resulting solution (L2) was then subjected to an evaporation step in the evaporation area (R3) in order to concentrate it before entering into the extraction area (E1). To do that, said solution (L2) was heated to evaporate the water, thus obtaining a liquid stream (L3) with a higher concentration of phosphoric acid and a solid residue, mainly consisting of $CaSO_4$. The evaporation ratio was 4/1 v/v (inlet/outlet) in order to concentrate the phosphoric acid from 90-110 g/L to about 400 g/L.

The liquor (L3) obtained after this step had the following main components which are shown in Table 3:

| | (L3), g/L | Solid residue, % |
|---|---|---|
| P | 115-125 | — |
| $H_3PO_4$ | 390-410 | — |
| $H_2SO_4$ | 0-40 | — |
| $SO_4^{2-}$ | 200-220 | 35-50 |
| Ca | 0.05-0.2 | 10-20 |

Once the phosphoric acid solution was concentrated to obtain the liquor (L3), this was fed to the extraction area (E1) where it was subjected to a liquid-liquid extraction under counter-current conditions by using tributyl phosphate (TBP) as organic extraction agent without using any carrier solvent. The volume ratio of organic phase (O)/aqueous phase (A) was 9/1. This step was conducted at 25° C. for a residence time of 10 minutes. Therefore, an organic phase (O1) containing phosphoric acid, the organic extraction agent and a lower amount of impurities, mainly sulfuric acid and some metal such as Cu, Zn and As, was obtained along with an acid aqueous raffinate (A1) containing most of the metal impurities present in the liquor (L3) an a minor amount of non-extracted phosphoric acid. Said aqueous raffinate (A1) was fed to the depletion area as detailed herein below.

The organic extract agent (TBP) not only extracted phosphoric acid but also a minor amount of sulfuric acid, as well as other metal impurities such as chlorides, zinc and iron. In order to remove said impurities and to avoid the presence of them in the final product, the organic phase (O1) was then washed with an aqueous solution of phosphoric acid (the concentration of phosphoric acid in the aqueous solution was 120 g/L, the volume ratio O/A being 10/1) at a temperature of 50° C. and a residence time of 10 min in the sulfuric washing area (W1), so as a washed organic phase (O2) containing phosphoric acid along with an aqueous phase (A2) containing sulfuric acid and other co-extracted metal cation impurities are obtained. This aqueous phase (A2) was recycled into the transforming area (R2), whereas the washed organic phase (O2) was subjected to a stripping step in the $H_3PO_4$ stripping area (RE1).

This stripping step was conducted in the presence of water at a temperature of 65° C. with a residence time of 10 min at a volume ratio O/A of 8/1. As a result, a purified aqueous solution (A3) of phosphoric acid was obtained, as well as an organic phase (O3) which was recycled into the extraction area (E1). Part of the purified aqueous solution (A3') was fed to the sulfuric washing area (W1).

TABLE 4 shows the composition of the purified aqueous solution containing phosphoric acid (A3) and the organic phase (03):

| | (A3), g/L | (O3), g/L |
|---|---|---|
| P | 76 | 0.7 |
| $H_3PO_4$ | 230 | 2 |
| $H_2SO_4$ | 0.05-0.09 | <1 |
| $SO_4^{2-}$ | 0.05-0.09 | <0.3 |
| Fe | <0.001 | <0.01 |
| Cu | <0.001 | <0.01 |
| Zn | <0.01 | <0.01 |
| Mn | <0.001 | 0 |
| As | 0.005-0.006 | 0 |

On the other hand, and in order to recover the phosphorous contained in the aqueous raffinate (A1) resulting from the extraction area (E1) and, therefore, to increase the overall phosphorous recovery efficiency, said aqueous raffinate (A1) was fed to a depletion area consisting in an extraction area (E2) and a stripping area (RE2).

Firstly, concentrated sulfuric acid was added to the aqueous raffinate (A1) containing the non-extracted phosphoric acid to reach a concentration of 400 g/L of sulfuric acid in the resulting mixture.

Said mixture containing the phosphoric acid and the sulfuric acid was then subjected to a solvent extraction step in the extraction area (E2) under counter-current conditions by using tributyl phosphate (TBP) as organic extraction agent without using any carrier solvent. The volume ratio of organic phase (O)/aqueous phase (A) was 4/1. This step was conducted at 25° C. for a residence time of 10 minutes and allowed to further separate the phosphoric acid from metal impurities contained in the aqueous raffinate (A1). As a result, an organic phase (O4) mainly containing phosphoric acid and sulfuric acid, as well as the organic extraction agent is obtained, along with an aqueous raffinate (A4) containing metal impurities and non-extracted sulfuric acid. Said aqueous raffinate (A4) was brought to an effluent treatment.

Then, the organic phase (O4) was subjected to a stripping step in the stripping area (RE2) in order to recover the phosphoric acid and sulfuric acid in pure form.

This stripping step was conducted in the presence of water at a temperature of 65° C. with a residence time of 10 min at a volume ratio O/A of 4/1. As a result, a purified aqueous solution (A5) of phosphoric acid and sulfuric acid was obtained, as well as an organic phase (O5) which was recycled into the extraction area (E2), and whose components are shown in Table 4 below:

| | (A5) | (O5) |
|---|---|---|
| P | 13 | 0.5 |
| $H_3PO_4$ | 40 | 1.5 |
| $H_2SO_4$ | 210 | 4 |
| $SO_4^{2-}$ | 206 | 3.9 |

The resulting purified aqueous solution (A5) of phosphoric acid and sulfuric acid was then partly fed to the leaching area (R1) and a minor amount (A5') was fed to the transforming area (R2), so that the phosphorous that could not be extracted in the extraction area (E1) was recovered to return it to the process, thus increasing the yield of the process and, therefore, the amount of phosphorous recovered in the form of phosphoric acid from that initially present in the solid raw material.

Accordingly, and as derivable from this example, the process of the invention allows phosphoric acid to be extracted in a very efficient way with a high level of purity that further meets the standards required to be considered of technical grade.

Example 2. Production of Technical Grade Phosphoric Acid

Example 1 was repeated but introducing one or more additional steps as the ones detailed below. These steps provide a technical grade of phosphoric acid with a minimum level of impurities.

Cu Removal

The leached solution (L1) obtained after the leaching step contained between 120 and 150 mg/L of Cu in the form of $CuSO_4$. Said leached solution (L1) was fed to a sulfidation area (R2) with the aim of selectively precipitating the Cu present in the leached solution (L1) and thus reducing the contamination of this element in the final product. In order to remove it, 2.5 g of $Na_2S$ per kg of SSA was added to the leached solution (L1), thus reaching a redox potential between 225 and 270 mV (Ag/AgCl), and at a temperature of 40° C. with a residence time of 10 minutes. As a result, a solid containing Cu in the form of CuS was obtained which was removed, whereas the Cu-free liquid phase (L1') containing the phosphoric acid was fed to the transforming area (R2).

In particular, the Cu was precipitated in the form of CuS with an effectiveness of 86%, thus providing a Cu content in the final purified aqueous solution lower than 30 mg/L.

Sulphuric Removal

The aqueous solution (A3) of phosphoric acid contained 50-90 mg of sulfuric acid/L as impurity which was not able to be removed in the washing step and then was present in the washed organic phase (O2). Thus, the aim of this step was to remove said impurities of sulfuric acid. Stoichiometric amounts of $BaCO_3$ were added to the aqueous solution (A3) in order to precipitate the residual sulfuric acid contained therein, thus precipitating $SO_4^{2-}$ ions in the form of $BaSO_4$ with a precipitation effectiveness of 75%. The reaction took place at a temperature of 80° C. and a residence time of 20 minutes. As a result, a free-sulfuric acid aqueous solution of phosphoric acid was obtained (A6) along with a $BaSO_4$ solid residue which is separated and removed.

Concentration of Phosphoric Acid

The aqueous solution (A6) resulting from the sulphate removal step was subjected to a heating process in order to evaporate the water of said solution, obtaining a liquor of phosphoric acid (A7) in a concentration of 75%, thus meeting the conditions for a technical grade phosphoric acid concentration. Namely, the content of phosphoric acid in the liquor (A7) was 1170 g/L.

As Removal

In order to precipitate As cations contained in the aqueous solution (A7) resulting from the concentration of phosphoric acid, 100× stoichiometric amounts of $Na_2S$ (or as an alternative $H_2S$) were added to said aqueous solution (A7) at a temperature of 30° C. and a residence time of 10 min. As a result, a purified liquor of phosphoric acid which fulfils the requirements to be considered as a technical grade phosphoric acid is obtained, along with a solid residue containing precipitated As in the form of $As_2S_3$ which was removed by filtration.

Figure 2:
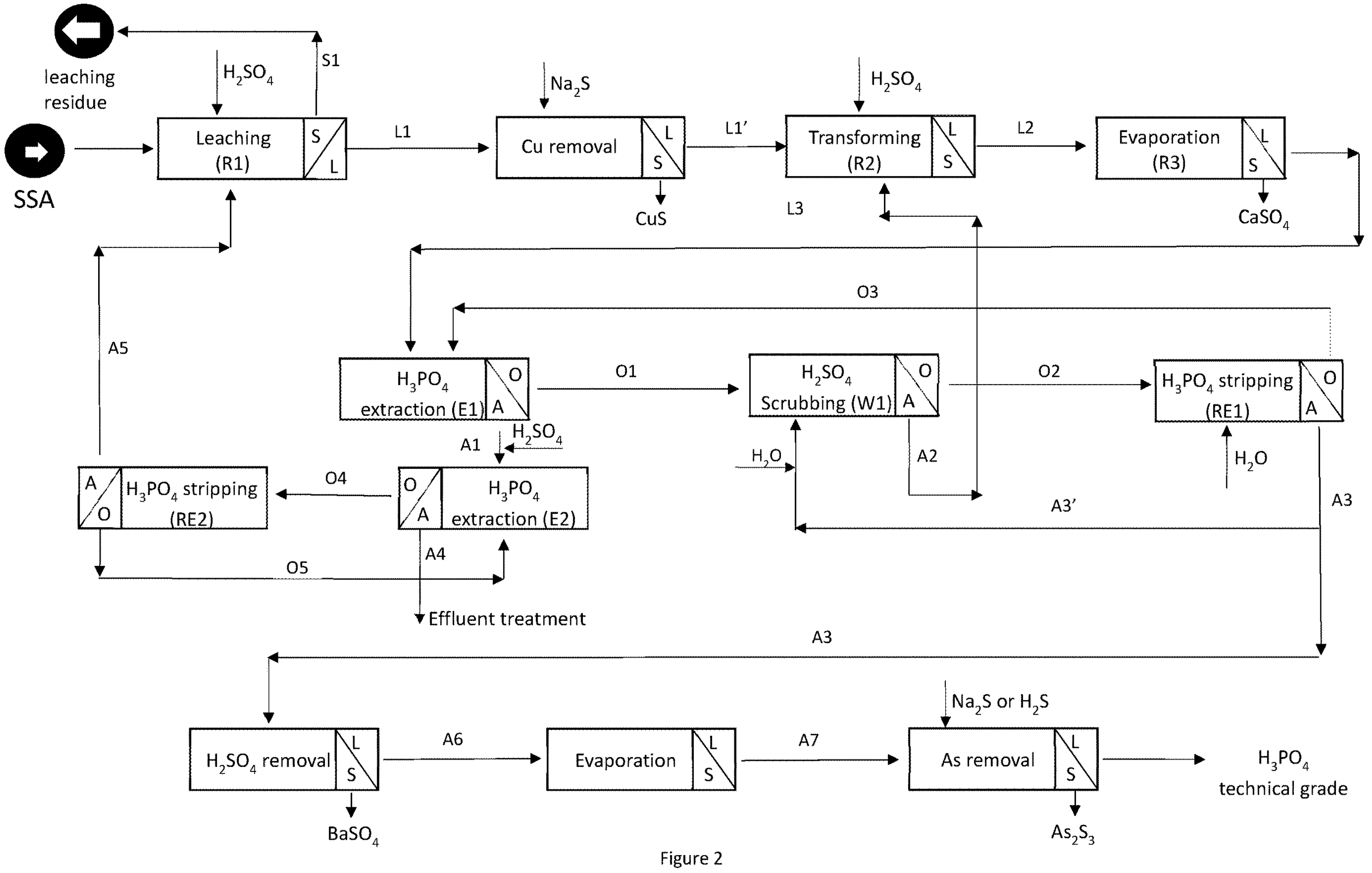
FIG. 2 illustrates a flow chart of additional steps included within the process of the invention.

FIG. 2 shows a flow chart showing these additional steps included within the process of the invention.

The invention claimed is:

1. A process for recovering phosphoric acid from a solid phosphorous-bearing raw material, said process comprising:

a) a leaching step of the phosphorous-bearing solid raw material with a sulphuric acid aqueous solution having a pH between 1 and 2 and at a temperature equal to or lower than 40° C., thus obtaining:

a.1) a first leached solution comprising, solubilized, a main fraction of the phosphorous contained in the solid raw material in the form of phosphoric acid and phosphate metallic salts; and a.2) a non-leached solid residue comprising a remaining fraction of the phosphorous contained in the solid raw material;

b) a transforming step wherein sulfuric acid is added to the first leached solution obtained in step (a) so as the phosphate metallic salts are transformed into phosphoric acid, thus obtaining a second leached solution comprising phosphoric acid as well as metallic impurities in the form of sulphates;

c) a first solvent extraction of the phosphoric acid from the second leached solution obtained in step b) with an organic solvent, thus obtaining a first phosphoric acid-loaded organic liquid phase and a first aqueous raffinate also containing non-extracted phosphoric acid as well as impurities;

d) washing the first phosphoric acid-loaded organic liquid phase obtained in step c) with diluted phosphoric acid aqueous solution, thus obtaining a second phosphoric acid-loaded organic liquid phase and a second aqueous raffinate containing sulphuric acid and metallic impurities;

e) a first stripping of phosphoric acid from the second phosphoric acid-loaded organic liquid phase obtained in step d) with water at a temperature between 5° and 70° C., thus obtaining a first aqueous solution containing phosphoric acid and an organic phase comprising the organic solvent;

f) subjecting the first aqueous raffinate obtained in step c) to a second solvent extraction which comprises:

adding sulfuric acid to the first aqueous raffinate to form a mixture;

extracting the phosphoric acid from the mixture with an organic solvent, thus obtaining:

a third phosphoric acid-loaded organic liquid phase also containing sulfuric acid, and a second aqueous raffinate containing impurities and non-extracted sulfuric acid; and g) a second stripping of phosphoric acid from the third phosphoric acid-loaded organic liquid phase obtained in step f) with water at a temperature between 5° and 70° C., thus obtaining a second aqueous solution containing phosphoric acid and sulfuric acid as well as an organic phase comprising the organic solvent, and at least part of the said second aqueous solution is returned to the leaching step a).

2. The process according to claim 1, wherein the solid phosphorous-bearing raw material is a sewage sludge ash having a phosphorous content, expressed in percentage by weight of phosphates in the ash, of at least 5%.

3. The process according to claim 1, wherein the addition of sulfuric acid in the leaching step a) is controlled so as to maintain the resulting leached solution at a pH of 1.

4. The process according to claim 1, wherein the sulfuric acid aqueous solution in the leaching step a) comprises the second aqueous solution resulting from step g), or alternatively comprises:

the second aqueous solution resulting from step g), and the acid aqueous solution resulting from step d).

5. The process according to claim 1, further comprising addition of $Na_2S$ to the leached solution obtained in the leaching step a) to precipitate copper contained therein in the form of CuS.

6. The process according to claim 1, wherein the sulphuric acid in step b) is used in a dose which varies from 20 to 50 g per liter of leached solution.

7. The process according to claim 1 which further comprises subjecting the second leached solution obtained in step b) to an evaporation step to obtain a liquid stream with a higher concentration of phosphoric acid before entering extraction step c).

8. The process according to claim 1, wherein the organic solvent used in the first solvent extraction step c) and in the second solvent extraction step f) is tributyl phosphate.

9. The process according to claim 1 wherein the organic phase resulting from step e) is recycled to the extraction step c).

10. The process according to claim 1, further comprising subjecting the first aqueous solution containing phosphoric acid as obtained in step e) to an evaporation process to obtain technical grade phosphoric acid.

11. The process according to claim 1, which further comprises addition of $BaCO_3$ to the first aqueous solution of phosphoric acid resulting from step e), to precipitate $SO_4^{2-}$ ions in the form of $BaSO_4$.

12. The process according to claim 1, which further comprises subjecting the first aqueous solution containing phosphoric acid resulting from step e) or from the process of claim 11 to an evaporation process to reach a concentration of at least 75% of phosphoric acid.

13. The process according to claim 1, which further comprises addition of $Na_2S$ to the first aqueous solution of phosphoric acid resulting from the stripping step e) or from the aqueous solution of phosphoric acid resulting from the process of claim 11 or from the concentrated solution of phosphoric acid resulting from the process of claim 12, to obtain a liquor of phosphoric acid without As cation impurities and a solid containing precipitated As in the form of $As_2S_3$.

14. The process according to claim 1, wherein the organic phase resulting from step g) is recycled to the extraction step f).

15. The process according to claim 1, wherein second aqueous raffinate resulting from step d) is recycled to the transforming step b).

* * * * *